W. A. GREAVES.
GEARING.
APPLICATION FILED NOV. 28, 1913.
1,162,857.
Patented Dec. 7, 1915.
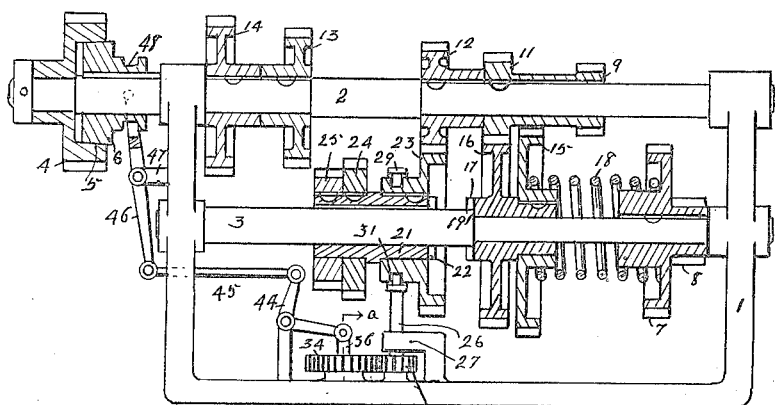
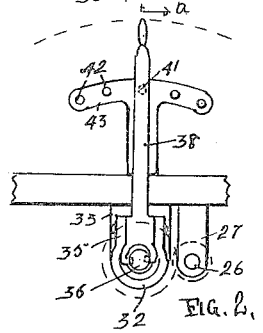
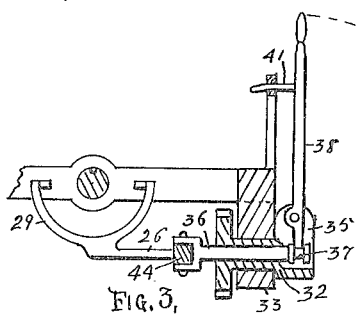
Witnesses:
James J. Carr
Samuel S. Carr
William A Greaves.  Inventor.
By Robert S. Carr. Attorney.

UNITED STATES PATENT OFFICE.

WILLIAM A. GREAVES, OF CINCINNATI, OHIO, ASSIGNOR TO THE GREAVES-KLUSMAN TOOL COMPANY, OF CINCINNATI, OHIO, A CORPORATION OF OHIO.

GEARING.

1,162,857. Specification of Letters Patent. Patented Dec. 7, 1915.

Application filed November 28, 1913. Serial No. 803,477.

*To all whom it may concern:*

Be it known that I, WILLIAM A. GREAVES, a citizen of the United States, residing at Cincinnati, Ohio, have invented a new and useful Improvement in Gearing, of which the following is a specification.

My invention relates to gearing of the class adapted to transmit different speeds and which is suited to the use of machine tools, motor vehicles or other suitable purposes.

The objects of my improvements are to provide a driving shaft with clutch connections with a source of power, and to provide a single hand lever with connections with the clutch and also with the change speed gears whereby said clutch and gears may be shifted alternately; to provide means for locking said gears in shifted position during the engagement of the clutch; and to provide such construction and assemblage of the various parts as to secure facility of operation and efficiency of action.

These objects may be attained in the following described manner as illustrated in the accompanying drawings, in which:

Figure 1 is a longitudinal diametrical section of a gearing embodying my improvements; Fig. 2, a front elevation of the shifting lever, and Fig. 3 a section on the line *a—a* of Fig. 1.

In the drawings, 1 represents the support whereon the parallel driving and driven shafts 2 and 3 may be journaled. The idle driven gear 4 on shaft 2 is formed with a friction clutch member 5 adapted to coöperate with the corresponding clutch member 6 which is splined on said shaft. The gears 7 and 8 secured on shaft 3 serve to transmit power at different speeds to a shaft or spindle not shown.

A graduated series of gears 9, 11, 12, 13, and 14 are secured on shaft 2. Gears 15 and 16 connected together are mounted to turn idly on shaft 3 and may be detachably engaged with the corresponding gears 9 and 11. Said gear 16 is formed with a clutch member 17 and a coil spring 18 serves to move and maintain it under a yielding pressure in engagement with gear 11 and also in contact with the shoulder 19 on shaft 3. A sleeve 21 formed with a clutch member 22 is splined on shaft 3 and provided with gears 23, 24, and 25 adapted to be successively engaged with the corresponding gears 12, 13, and 14 on shaft 2. A shaft 26 journaled in a fixed bearing 27 is provided with a pinion 28 and with a shifter yoke 29 in movable engagement with the annular groove 31 formed in the hub of gear 23.

A sleeve 32 journaled in the fixed bearing 33 is provided on one end with a gear 34 in engagement with the pinion 28 and formed on the other end with laterally projecting parallel jaws 35. The plunger 36 movable within the sleeve is formed with an annular groove 37 near one end and a hand lever 38 fulcrumed between the jaws 35 terminates in movable engagement with said groove. Said lever is provided with a pin 41 adapted to selectively engage with the holes 42 formed in the stationary plate 43. A bell crank lever 44 pivotally mounted at a fixed point is hinged at one end to the corresponding end of the plunger 36 and at the other end to the link 45 which connects with the end of the shifting yoke lever 46. Said yoke lever is fulcrumed on a fixed support 47 and movably engages with the annular grove 48 formed in the hub of the clutch member 6.

In operation, an outward movement of the hand lever disengages the pin thereon from the holes in the stationary plate and simultaneously moves the plunger in an inward direction for actuating the bell crank lever, link and yoke lever to disengage the friction clutch member from the idle driven gear on the driving shaft. Said driving shaft being disconnected from the source of power continues to turn idly for a short time from its own momentum. The hand lever may now be moved in a lateral direction together with its connecting sleeve and gear for actuating the pinion at a higher speed for quickly moving the shifter yoke and sleeve with the change speed gears thereon into selective engagement with the corresponding gear on the driving shaft. When the movement of the said hand lever is continued toward the left, the clutch member on the sleeve engages with the clutch member on the idle gears on the driven shaft and by overcoming the exertion on the coil spring serves to move said idle gears to successively disengage gear 16 from gear 11 and engage gear 15 with gear 9. When the hand lever is returned toward the left, the said spring automatically returns gears 15 and 16 to the position shown in Fig. 1. After the selected gear on the driven shaft is engaged in this manner with the corresponding gear on the driving shaft the inward movement of the hand lever engages the pin in the corresponding hole 42 in the stationary plate thus locking the selected gears in engagement and simultaneously actuating the bell crank lever connections to clutch the driving shaft to the driven idle gear thereon.

Successive graduations in the full range of speed changes may be secured by moving the hand lever laterally from one extreme position to the other. As the gears on the driven shaft can be shifted only after the driving shaft is disengaged from its source of power, all stripping of the ends of the gears is obviated and they may be moved into and out of engagement easily and with little friction or resistance. Owing to the pinion on the shifter yoke shaft being smaller than its driving gear on the hand lever sleeve the shifting action on the gears may be done with greater speed and with a shorter lateral movement of the hand lever than would be otherwise possible. It is evident that the various parts may be differently arranged to adapt them to a wide variety of purposes without departing from the spirit of my invention.

Having fully described my improvements, what I claim as my invention and desire to secure by Letters Patent of the United States is:—

A gearing comprising a driving shaft, a driven member mounted to turn thereon, clutch connections between them, a driven shaft, change speed gear connections from the driving shaft therewith, an angular yoke lever journaled in fixed bearings and a pinion thereon for actuating said gear connections, a sleeve journaled in a fixed bearing and provided with laterally projecting jaws and with a gear engaging with the pinion, a plunger concentric with the sleeve, a hand lever provided with a detent being pivoted thereon and fulcrumed on the jaws, a series of stops adapted to separately engage with the detent for locking the lever with corresponding gear connections in engagement, and lever connections from the plunger with the clutch, whereby the movement of the lever to carry the detent out of engagement with the stops actuates the plunger with said lever connections to disengage the clutch.

WM. A. GREAVES.

Witnesses:
WM. H. MORRIS,
H. H. KLUSMAN.

Copies of this patent may be obtained for five cents each, by addressing the "Commissioner of Patents, Washington, D. C."